(12) United States Patent
Genty et al.

(10) Patent No.: US 7,003,662 B2
(45) Date of Patent: Feb. 21, 2006

(54) SYSTEM AND METHOD FOR DYNAMICALLY DETERMINING CRL LOCATIONS AND ACCESS METHODS

(75) Inventors: Denise Marie Genty, Austin, TX (US); Guha Prasad Venkataraman, Austin, TX (US); Jacqueline Hegedus Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 09/864,112

(22) Filed: May 24, 2001

(65) Prior Publication Data
US 2002/0178361 A1 Nov. 28, 2002

(51) Int. Cl.
*H04L 9/00* (2006.01)
*G06F 15/16* (2006.01)

(52) U.S. Cl. ............. 713/158; 713/153; 713/156; 713/157; 713/166; 713/175; 713/182; 713/201; 705/78; 705/80; 709/229

(58) Field of Classification Search ............... 713/156, 713/158, 175
See application file for complete search history.

(56) References Cited

U.S. PATENT DOCUMENTS

| | | | | |
|---|---|---|---|---|
| 5,657,390 A | | 8/1997 | Elgamal et al. | 713/151 |
| 5,671,279 A | * | 9/1997 | Elgamal | 705/79 |
| 5,677,955 A | * | 10/1997 | Doggett et al. | 705/76 |
| 5,903,882 A | * | 5/1999 | Asay et al. | 705/44 |
| 5,922,074 A | | 7/1999 | Richard et al. | 713/200 |
| 5,950,195 A | | 9/1999 | Stockwell et al. | 707/4 |
| 5,983,350 A | | 11/1999 | Minear et al. | 713/201 |
| 6,202,157 B1 | * | 3/2001 | Brownlie et al. | 713/201 |
| 6,289,450 B1 | | 9/2001 | Pensak et al. | 713/167 |
| 6,618,806 B1 | | 9/2003 | Brown et al. | 713/186 |
| 2002/0099668 A1 | * | 7/2002 | Perlman | 705/76 |

OTHER PUBLICATIONS

Schneier, Bruce, "Applied Cryptography," 1996, John Wiley and Sons, Second Edition, pp. 185-187.

* cited by examiner

*Primary Examiner*—Kambiz Zand
(74) *Attorney, Agent, or Firm*—Van Leeuwen & Van Leeuwen; Joseph T. Van Leeuwen; Herman Rodriguez

(57) ABSTRACT

A system and method for dynamically determining a CRL location and protocol. CRL location names and protocols are retrieved from a digital certificate data structure which includes a network servers that contain the CRL file. A determination is made as to whether any of the servers reside in the current domain, in which case the server is used because the data is more secure. If no locations are within the current domain, Internet servers outside the current domain are analyzed. Security parameters may be established that restrict which Internet servers can be used to retrieve the data. The security parameters may also include which access methods may be used to retrieve data since some access methods provide greater security than other access methods. A security parameter may also be based upon both the access method and the name, or address, of the Internet server.

14 Claims, 13 Drawing Sheets

SYSTEM AND METHOD FOR DYNAMICALLY DETERMINING CRL LOCATIONS AND ACCESS METHODS

RELATED APPLICATIONS

This application is related to the following co-pending U.S. Patent Applications filed on the same day as the present application and each assigned to the IBM Corporation: "System and Method for Selectively Confirming Digital Certificates in a Virtual Private Network," Ser. No. 09/864,110, by Fiveash, Genty, and Wilson System and Method for Multiple Virtual Private Network Authentication Schemes Ser. No. 09/864,136, by D'Sa, Fiveash, Genty, Venkataraman, and Wilson.

BACKGROUND OF THE INVENTION

1. Technical Field

The present invention relates in general to a method and system for securing networks. Still more particularly, the present invention relates to an improved system and method for providing multiple authentication schemes to authenticate computer systems that are members of a virtual private network.

2. Description of the Related Art

In today's modern environment, many businesses and organizations deal with global markets and have global logistic concerns. Many organizations have facilities disbursed across the country or even around the world. Despite their global presence, these organizations need a way to maintain fast, secure and reliable communications with individuals and other offices throughout the world.

Until recently, fast, secure and reliable communication has meant the use of leased lines to maintain a Wide Area Network (WAN). Leased lines, ranging from ISDN (Integrated Services Digital Network, 144 Kbps) to OC3 (Optical Carrier-3, 155 Mbps) fiber, provided a company with a way to expand their private network beyond their immediate geographic area. A WAN had obvious advantages over a public network like the Internet when it came to reliability, performance and security. But maintaining a WAN, particularly when using leased lines, can become quite expensive and often rises in cost as the distance between the offices increases. In addition, using WANs is not a scalable solution as the number of interconnections rises exponentially as new locations are added.

In essence, a Virtual Private Network, or "VPN," is a private network that uses a public network (usually the Internet) to connect remote sites or users together. To make communication between computers private, VPNs use security methods, such as encryption, to maintain privacy. Instead of using a dedicated, real-world connection such as leased line, a VPN uses "virtual" connections routed through the Internet from the company's private network to the remote site or employee.

A well-designed VPN can greatly benefit a company. For example, it can: extend geographic connectivity, improve security, reduce operational costs versus traditional WAN, reduce transit time and transportation costs for remote users, improve productivity, simplify network topology, provide global networking opportunities, provide telecommuter support, provide broadband networking compatibility, and provide faster ROI (Return On Investment) than traditional WAN. A well-designed VPN, therefore, should incorporate features for security, reliability, scalability, network management, and policy management.

In a VPN, each remote member of the network is able to communicate in a secure and reliable manner using the Internet as the medium to connect to a private local area network, or "LAN." A VPN can grow to accommodate more users and different locations much easier than a leased line. In fact, scalability is a major advantage that VPNs have over typical leased lines. Unlike leased lines, where the cost increases in proportion to the distances involved, the geographic locations of each office matter little in the creation of a VPN.

A well-designed VPN uses several methods for keeping connections and data secure. Firewalls provide a strong barrier between private networks and the Internet. Firewalls can restrict the number of open ports, what type of packets are passed through, and which protocols are allowed through. Encryption is used to encode all the data that one computer is sending to another into a form that only the other computer will be able to decode. Two modes of authentication are used on VPNs: pre-shared keys and digital signatures.

Pre-shared key encryption means that each partner in a VPN has a secret "key" that it can use to authenticate the remote identifier of a VPN. Pre-shared key encryption requires that you know which computers will talk to each other, and that you install the same key on each one.

Digital signature authentication, on the other hand, uses a combination of a private key and a public key. The private key is known only to your computer while the public key is given by your computer to any computer that wants to communicate securely with it. To decode an encrypted message, the receiving computer must use the public key provided by the originating computer. Public keys are bound to an identity, such as a business or a user, by using "digital certificates" that are typically issued by a trusted third party.

The key is based on a hash value. This is a value that is computed from a base input number using a hashing algorithm. The important thing about a hash value is that it is nearly impossible to derive the original input number without knowing the data used to create the hash value. Public keys generally use complex algorithms and very large hash values for encrypting.

On a typical VPN, the authentication of the initial connection is accomplished using public key algorithm. Once the connection is established and authenticated, keying material is sent from one computer to the other and the connection switches to symmetric encryption, such as DES or Triple DES. Symmetric encryption is used during data transfer because the amount of time decoding data is reduced.

The Internet Protocol Security Protocol (IPsec) provides enhanced security features such as strong encryption algorithms and comprehensive authentication. IPsec has two encryption modes: tunnel and transport. Tunnel mode tunnels the original packet and builds a new IP header, while transport mode inserts the IPsec payload between the IP header and the data. Systems that are IPsec compliant can take advantage of this protocol. Also, all devices negotiate security parameters, but they must have compatible security policies set up. IPsec works well on both Remote-Access and Site-to-Site VPNs. IPsec must be supported at both tunnel interfaces to work.

Many VPNs rely on tunneling to create a private network that reaches across the Internet. Essentially, tunneling is the process of placing an entire packet within another packet and sending it over a network. The protocol of the outer packet is understood by the network and both points, called tunnel interfaces, where the packet enters and exits the VPN.

Tunneling uses three different protocols: (1) carrier protocol: the protocol used by the network that the information is traveling over; (2) encapsulating protocol: the protocol that is wrapped around the original data; and (3) passenger protocol: the original data (IPX, NetBeui, IP) being carried.

Tunneling has important implications for VPNs. For example, a packet that uses a protocol not supported on the Internet (such as NetBeui) can be placed inside an IP packet and sent it safely over the Internet. Or a packet that uses a private (non-routable) IP address can be placed inside a packet that uses a globally unique IP address in order to extend a private network over the Internet. Tunneling is also necessary for gateways because the IP header needs to have the gateway IP address in it.

An analogy of tunneling is having a computer delivered to you by a courier service. The vendor packs the computer (passenger protocol) into a box (encapsulating protocol) which is then put on a courier truck (carrier protocol) at the vendor's warehouse (entry tunnel interface). The truck (carrier protocol) travels over the highways (Internet) to your home (exit tunnel interface) and delivers the computer. You open the box (encapsulating protocol) and remove the computer (passenger protocol).

A challenge with VPNs, however, is that there are many configuration options. VPNs may use different authentication (security) schemes with different certificate authorities and different Certificate Revocation List (CRL) servers. In addition, the CRL information may be retrieved from a variety of network locations using a variety of protocols.

What is needed, therefore, is a way to dynamically determine a location and protocol to use when retrieving CRL information to improve security and performance.

SUMMARY

It has been discovered that a CRL location and protocol can be dynamically determined. CRL location names and protocols are retrieved from a data structure included in the digital certificate corresponding to a remote computer system. This list includes a list of network servers that contain the corresponding CRL file. A first determination is made as to whether any of the servers reside in the current domain (i.e., in the intranet, within the organization's firewall). If any server is in the current domain, then this server is used because the data is more secure. Because the data is secure, the fastest access method, such as FTP, is used to retrieve the CRL data.

If no locations are within the current domain, network servers outside the current domain (i.e., on the Internet) are analyzed. Security parameters may be established that restrict which Internet servers can be used to retrieve the data. The security parameters may also include which access methods may be used to retrieve data since some access methods provide greater security than other access methods. In addition, a security parameter may be established which determines which Internet servers may be used based upon both the access method and the name, or address, of the Internet server.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
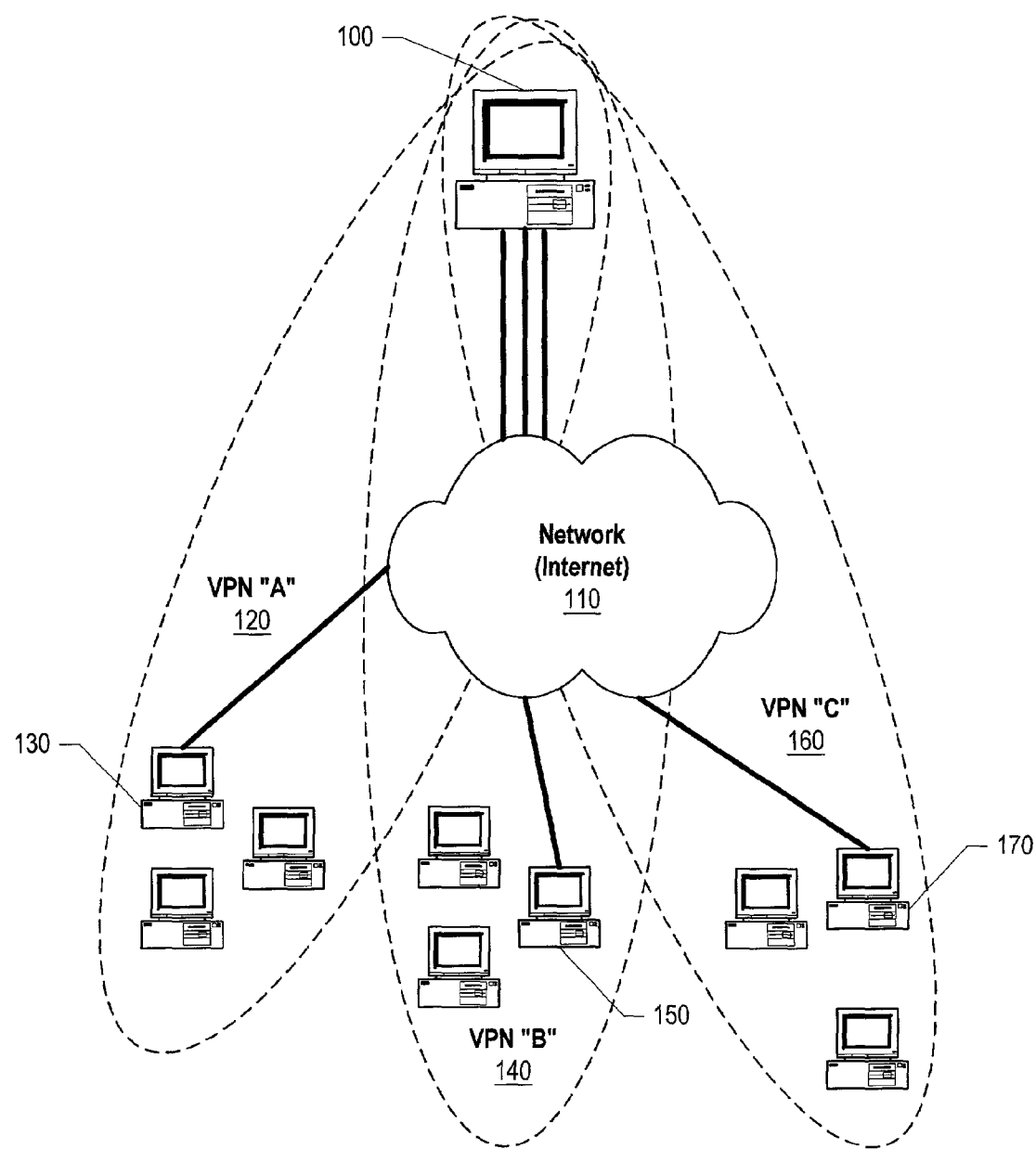
FIG. 1 is a system diagram showing a single computer using multiple tunnels to communicate with various VPNs.

FIG. 1 shows a system diagram of a single computer using multiple tunnels to communicate with various virtual private networks (VPNs). Computer system 100 is shown using computer network 110, such as the Internet, to communicate to computers using three VPNs—VPN "A" (120), VPN "B" (140), and VPN "C" (160). Three tunnels are shown connecting computer system 100 to first computer system 130, second computer system 150, and third computer system 170. First computer system 130 is shown as a member of VPN "A" (120), second computer system 150 is shown as a member of VPN "B" (140), and third computer system 170 is shown as a member of VPN "C" (160). Each of the VPNs may use a different authentication means to secure the data traveling between the computer systems. For example, computers within VPN "A" 120 may use a pre-shared key (i.e., a common key shared amongst the computers used to derive encryption keys). VPN "B" 140, on the other hand, may use public key encryption to encrypt the data. Finally, VPN "C"

160 may use digital signatures with digital certificates verified by a trusted third party, also called a "certification authority," or "CA".

Figure 2:
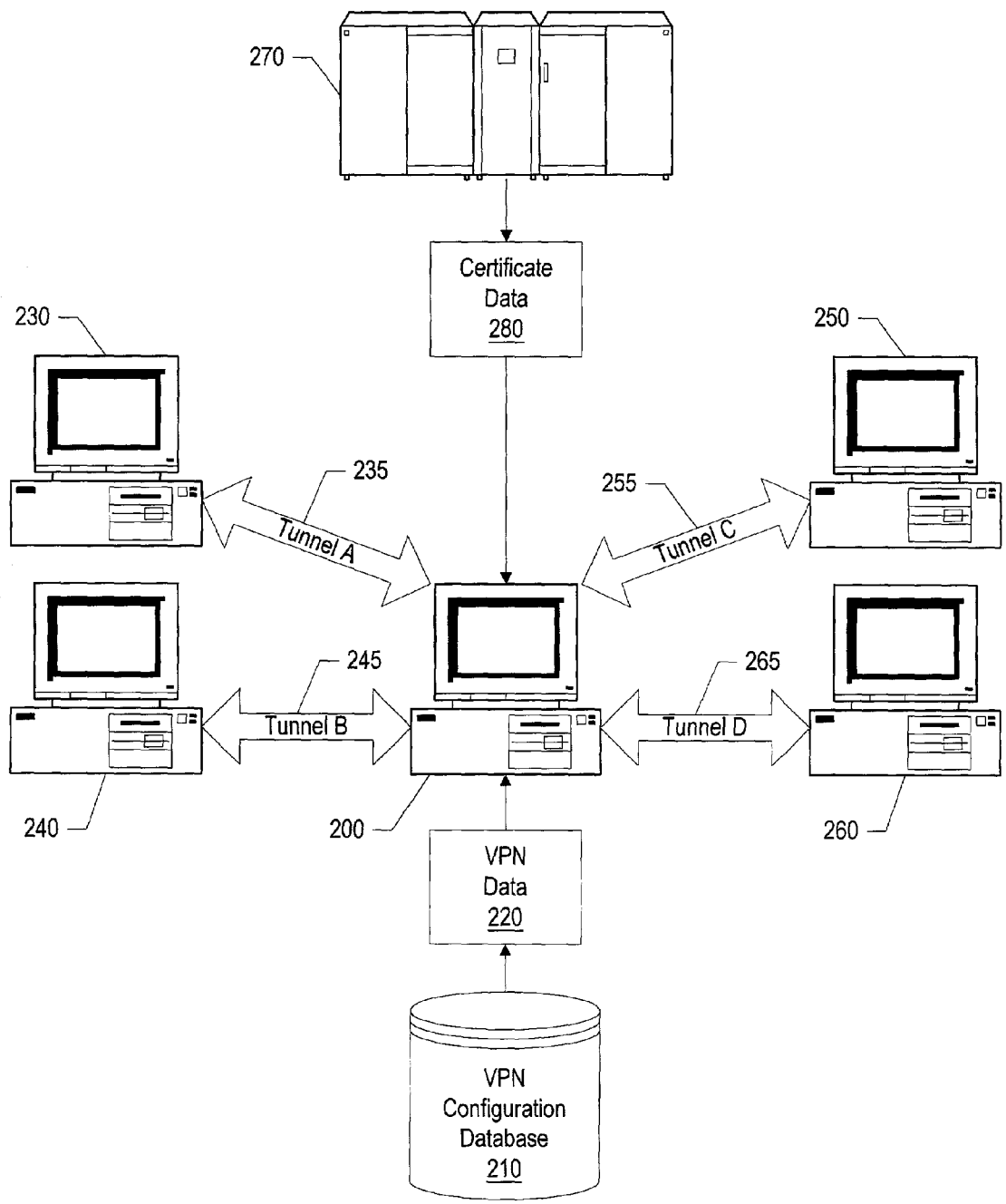
FIG. 2 is a diagram showing tunnels being created between a computer and other computers using VPN configuration data and certificate data.

FIG. 2 shows a diagram of tunnels being created between a computer and other computers using VPN configuration data and certificate data. Computer system 200 establishes various tunnels used to securely transmit data to and from other computer systems. Computer systems that computer system 200 wishes to securely communicate with over a VPN are identified in VPN configuration database 210. VPN data 220 contains information for connecting with a particular computer system. Using VPN configuration database 210, any number of VPNs can be established between computer system 200 and other computer systems. Some VPNs use certificate data 280 supplied by a trusted third party computer system 270. The use of a trusted third party aids in authenticating users and ensuring that an imposter does not take the place of another computer system.

In the example shown, computer system 200 establishes tunnel A 235 securely connecting first computer system 230 with computer system 200. Likewise, tunnel B 245 securely connects second computer system 240 with computer system 200, tunnel C 255 securely connects third computer system 250 with computer system 200, and tunnel D 265 securely connects fourth computer system 260 with computer system 200. Each of these computer systems, 230, 240, 250, and 260, have identification information and authentication information stored in VPN configuration database 210.

Figure 3:
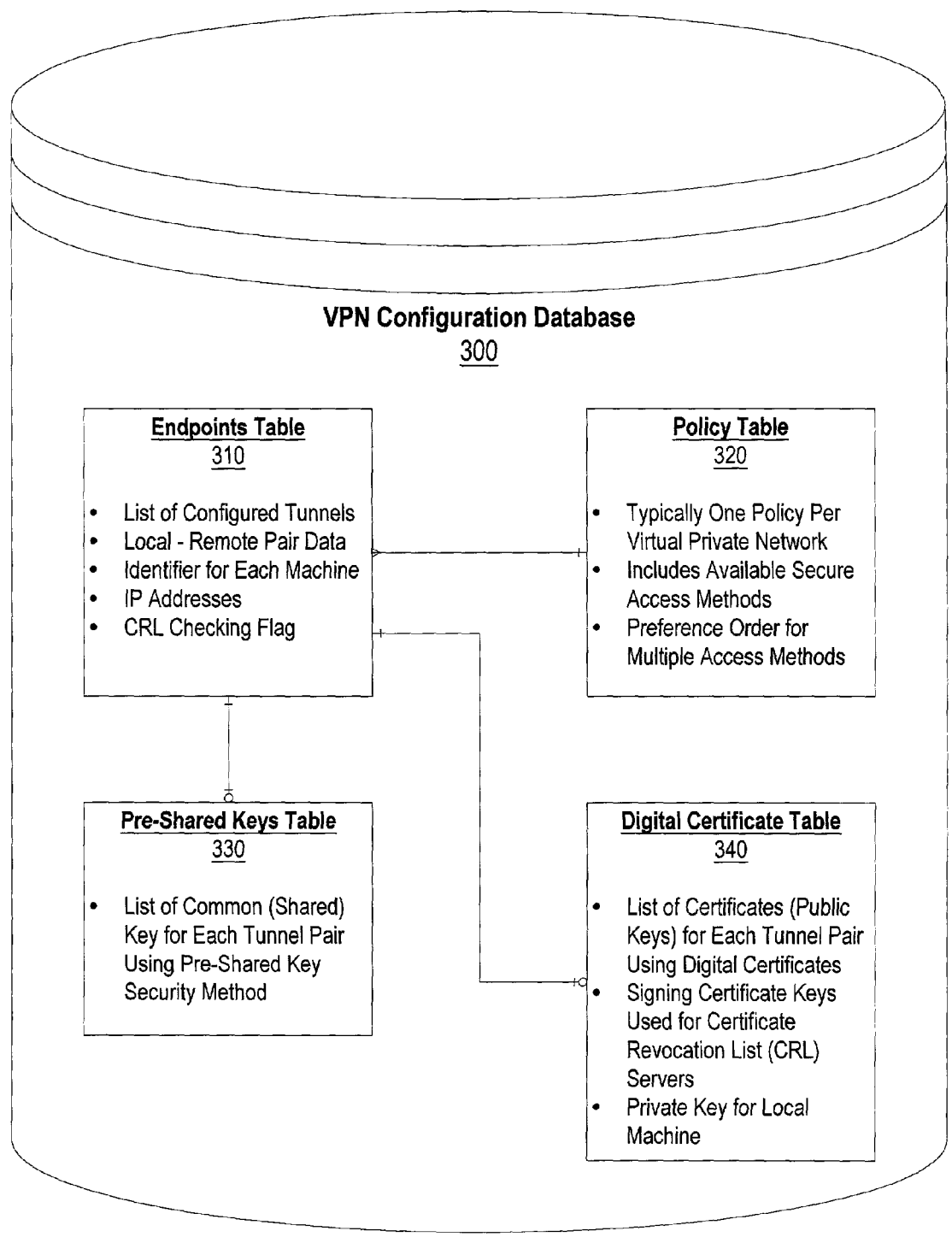
FIG. 3 is a database diagram showing tables used in configuring tunnels between the computer and other computer systems.

FIG. 3 shows a database diagram of tables used in configuring tunnels between the computer and other computer systems. VPN configuration database 300 is shown with four tables. Endpoints table 310 includes a list of configured tunnels between the computer system and other computer systems. One end of each endpoint identifies the computer system, while the other end of the endpoint identifies a remote computer. Each of the computers included in endpoints table 310 is identified with an identifier, such as an address. In addition, endpoints table 310 includes IP addresses for the remote computer systems. An IP address is an identifier for a computer or device on a TCP/IP network. Networks using the TCP/IP protocol route messages based on the IP address of the destination. The format of an IP address is a 32-bit numeric address written as four numbers separated by periods. Each number can be zero to 255. For example, 1.160.10.240 could be an IP address. Within an isolated network, IP addresses can be assigned at random so long as each one is unique. However, connecting a private network to the Internet requires using registered IP addresses (called Internet addresses) to avoid duplicates. The four numbers in an IP address are used in different ways to identify a particular network and a host on that network. Finally, endpoints table 310 includes a flag indicating whether a Certificate Revocation List (CRL) is used to check whether a given certificate has been revoked. Other valid ID types include FQDN, user@FQDN, distinguished names, and key IDs.

Endpoints table 310 has relationships with three other tables in VPN configuration database 300. Each local-remote computer pair included in endpoints table 310 may have a pre-shared key stored in pre-shared keys table 330 or a public key stored in digital certificate table 340. In some situations, a local-remote computer pair may have both a pre-shared key and a public key. Finally, a policy from policy table 320 exists for one or more set of endpoints determining the access method and preference order for connecting the local computer to a given remote computer.

Policy table 320 is used to employ a connection policy used by a given VPN. Typically, one policy exists for each VPN that the local machine uses. Policy table 320 includes the available secure access methods, such as pre-shared key and digital certificates, that are available in using the VPN. In addition, policy table 320 includes a preference order for establishing secure connections when multiple access methods are available. For example, a VPN may prefer using digital certificates to establish secure connections. However, if the computer system is unable to make a secure connection using a digital certificate, a pre-shared key method may also be available as a second course of action.

Pre-shared keys table 330 includes a list of common, or shared, keys for each tunnel pair that uses a pre-shared key security method. Computers using a pre-shared key have the same key to derive encryption and decryption keys. The pre-shared key is often provided to the computer system or the user in a way to reduce the chance that the key is misappropriated. For example, a pre-shared key may be mailed from a company to a client. The client then uses the pre-shared key to establish secure communications with the company computer system. Different pre-shared keys are used for each combination of computer systems. In this manner, if one pre-shared key is compromised only data at the two systems using that key are in jeopardy.

Digital certificate table 340 includes a list of certificates (Public Keys) for each tunnel pair that uses digital certificates to secure communications. In addition, digital certificate table 340 may include signing digital certificate keys used for Certificate Revocation List servers to determine whether a given certificate has been revoked. Public key encryption uses a private key to encrypt information destined for a given computer system. The receiving computer system deciphers the information by using the sender's public key. The local computer system's private key is also included in digital certificate table 340.

Figure 4:
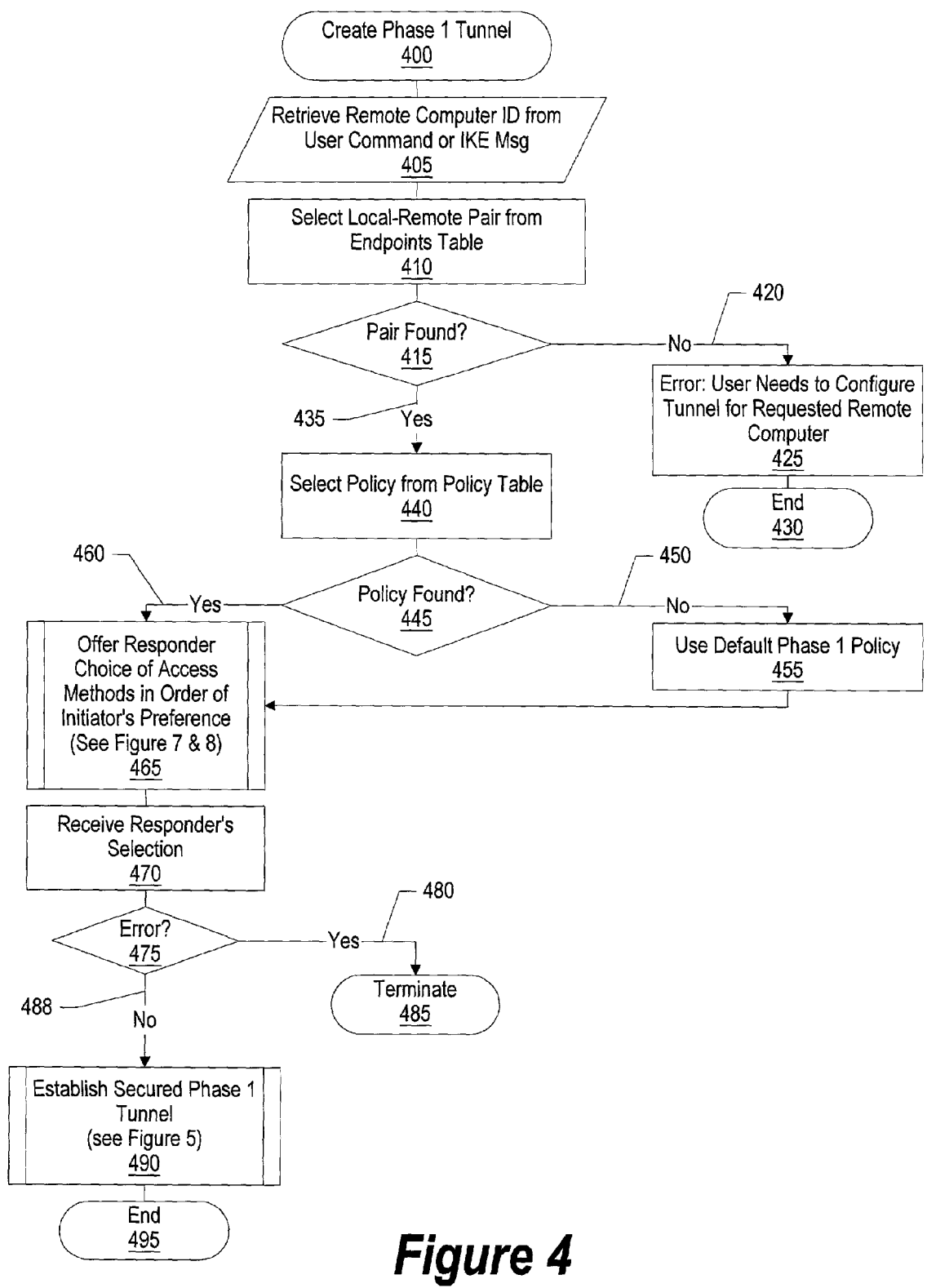
FIG. 4 is a flowchart showing the creation of a phase 1 tunnel using VPN configuration data.

FIG. 4 shows a flowchart of the creation of a tunnel using VPN configuration data. Processing commences at 400 whereupon a remote computer identifier is retrieved (input 405) corresponding to a remote computer to be connected in a VPN with the current computer system. The remote computer ID is typically received from a user command or IKE message. The remote computer ID is retrieved for both the initiator and the responder. The local-remote endpoints pair corresponding to the remote computer system identifier and the local computer identifier is selected from the endpoints table (step 410). The ID Rules List links the local-remote endpoints pair to a security policy name that is used in selecting the security policy (see step 440). A determination is made as to whether the endpoints pair was found (decision 415). If the pair was not found, decision 415 branches to "no" branch 420 whereupon an error is reported that the user needs to configure a tunnel with the remote computer system before the tunnel can be used (step 425) and processing terminates (end 430). Additionally, step 425 could invoke a configuration screen allowing the user to configure the tunnel with the remote computer by supplying the needed access information.

If the pair was found in the endpoints table, decision 415 branches to "yes" branch 435 whereupon a policy corresponding to the local-remote pair is selected from the policy table (step 440). The policy includes a proposal list with separate initiator and responder proposals. Proposals have general characteristics, like lifetimes and transform names. Transforms include specific encryption algorithms, hash algorithms, and authentication methods being proposed. A determination is made as to whether a corresponding policy was found (decision 445). If a corresponding policy was not found, decision 445 branches to "no" branch 450 whereupon a default policy is used (step 455). For example, a default policy could be used to use a digital certificate (if available), before attempting to use any available pre-shared keys. If the policy is found, decision 445 branches to "yes" branch 460.

Figure 7:
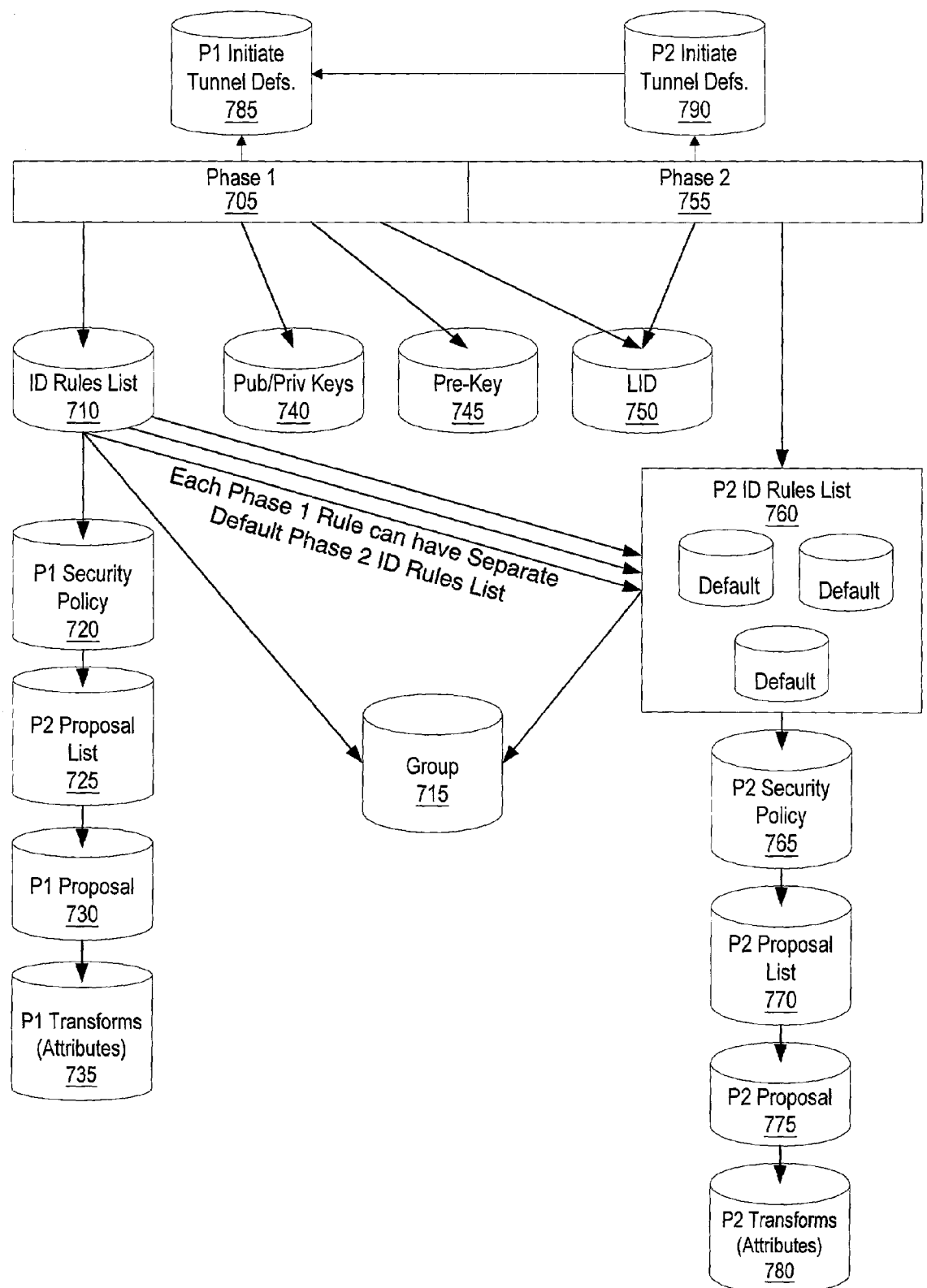
FIG. 7 is a database diagram showing a database used to provide flexible security policies for phase 1 and phase 2 processing.
Figure 8:
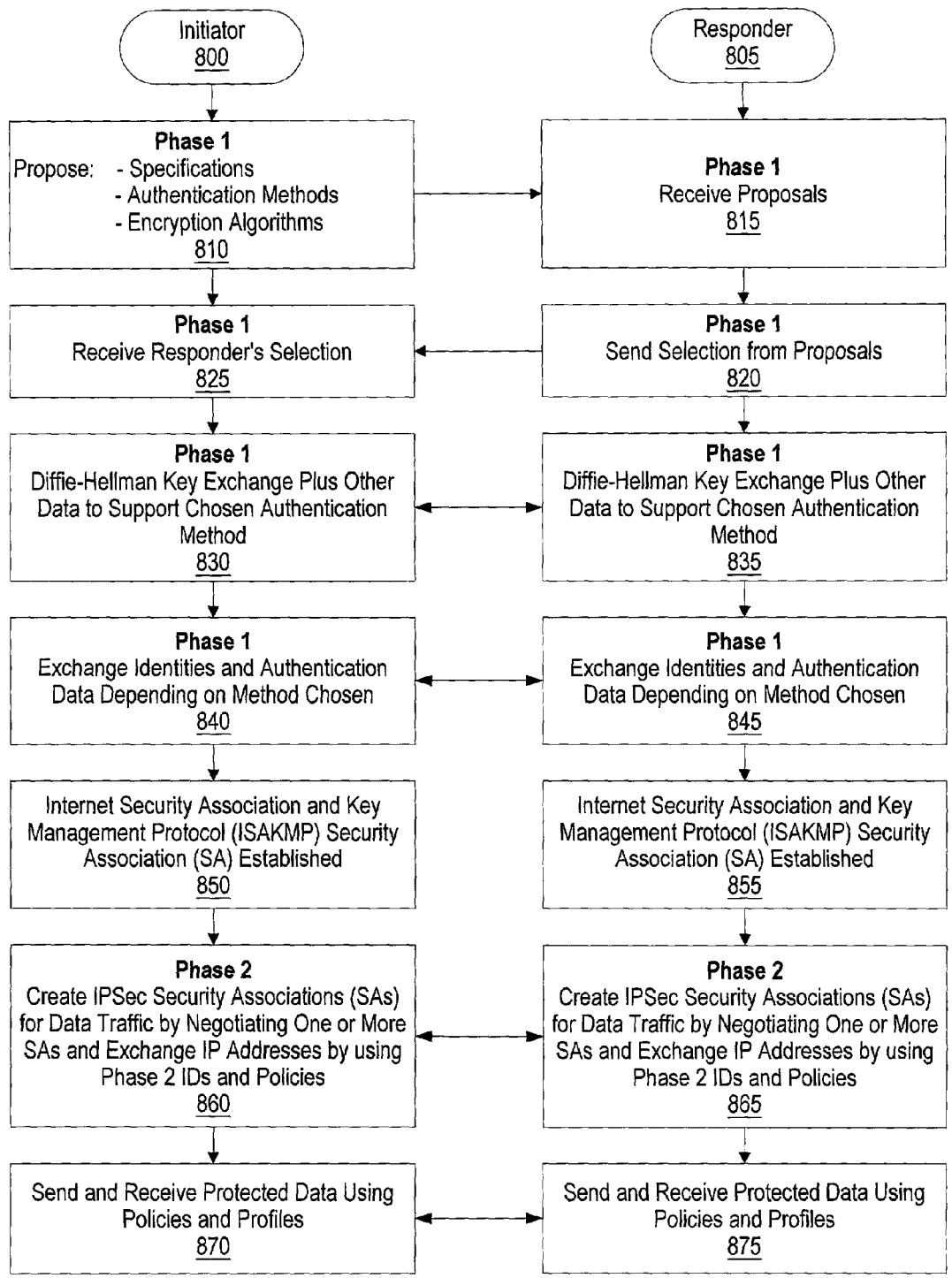
FIG. 8 is a flowchart showing steps performed in using policies to communicate through phase 1 and phase 2 processing.

The initiator proposes one or more authentication methods to the responder in the order of initiator's preference (predefined process 465, see FIGS. 7 and 8 for further details). The initiator receives the responder's selection of an authentication method (step 470). A determination is made as to whether an error occurred in receiving the responder's selection (decision 475). If an error occurred, decision 475 branches to "yes" branch 480 whereupon processing terminates at 485. On the other hand, if an error did not occur, decision 475 branches to "no" branch 488 whereupon a secure phase 1 tunnel is created between the initiator and the responder for setting up the phase 2 negotiations to select security choices for data traffic (predefined process 490, see FIG. 5 for further details). Predefined process 490 includes validating IDs, certificates, or pre-shared keys as well as checking the "liveliness" of the connection that the other computer matches the retrieved endpoint computer description during the entire conversation. After predefined process 490, create phase 1 tunnel processing terminates at 495.

Figure 5:
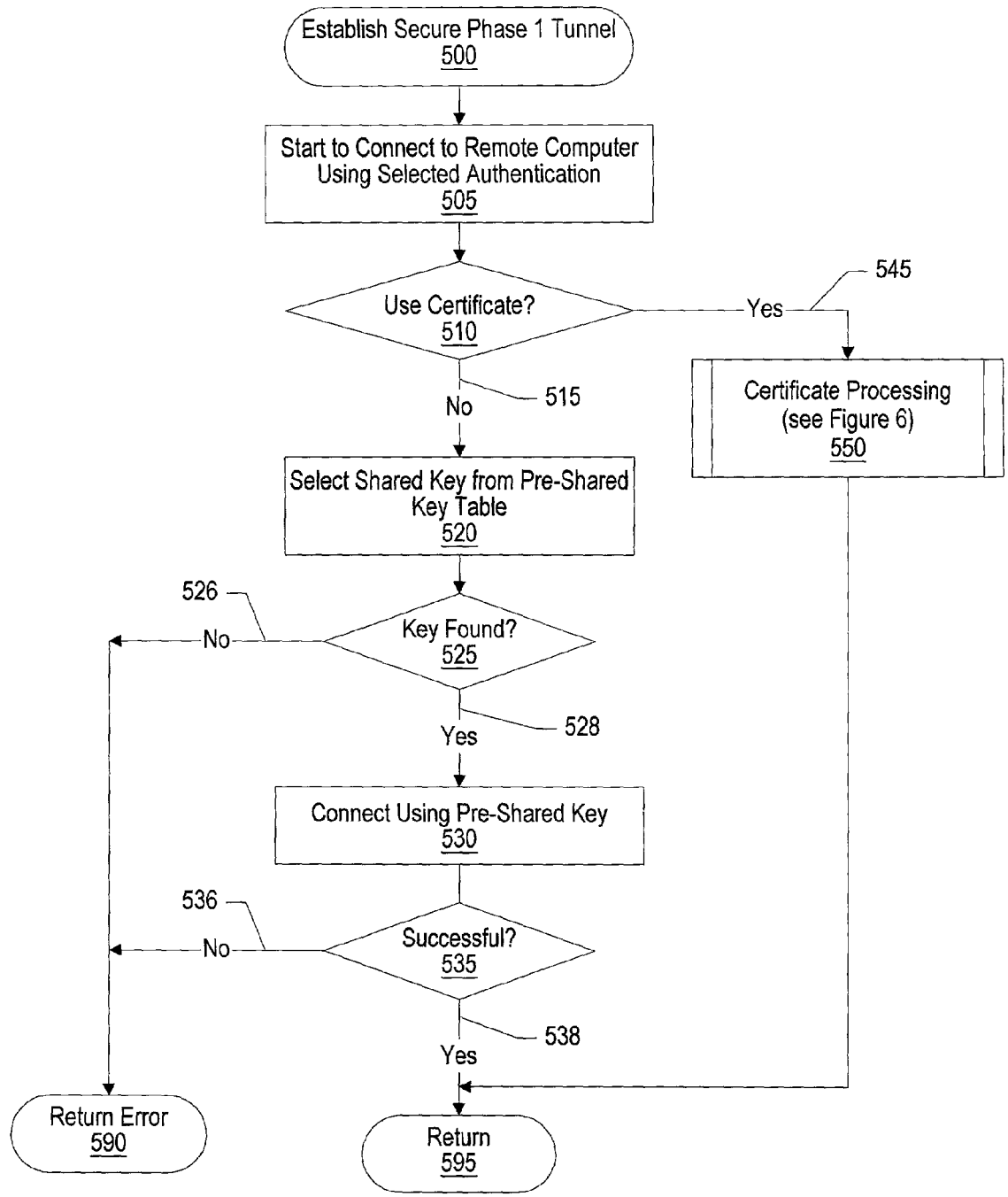
FIG. 5 is a flowchart showing the details involved in creating a secure phase 1 tunnel using the VPN configuration data.

FIG. 5 shows a flowchart of the details involved in creating a secure tunnel using the VPN configuration data. Processing commences at 500 whereupon the local computer connects to the remote computer using the selected authentication method (step 505). A determination is made as to whether the authentication method uses a digital certificate (decision 510). If the authentication method uses a digital certificate, decision 510 branches to "yes" branch 545 whereupon certificate processing commences (predefined process 550, see FIG. 6 for further details.

On the other hand, if the access method does not use a digital certificate, decision 510 branches to "no" branch 515 whereupon a pre-shared key corresponding to the remote computer system is selected from the pre-shared key table (step 520). A determination is made as to whether the pre-shared key is found (decision 525). If the pre-shared key is not found, decision 525 branches to "no" branch 526 whereupon an error is returned at 590.

If the pre-shared key is found, decision 525 branches to "yes" branch 528 whereupon the local machine attempts to connect to the remote machine using the selected pre-shared key (step 530). A determination is made as to whether the local machine successfully connected to the remote machine (decision 535). If the local machine did not successfully connect to the remote machine, decision 535 branches to "no" branch 536 whereupon an error is returned at 590. On the other hand, if the local machine successfully connects to the remote machine, decision 535 branches to "yes" branch 538 whereupon processing returns to the calling routine (return 540, see FIG. 4).

Figure 6:
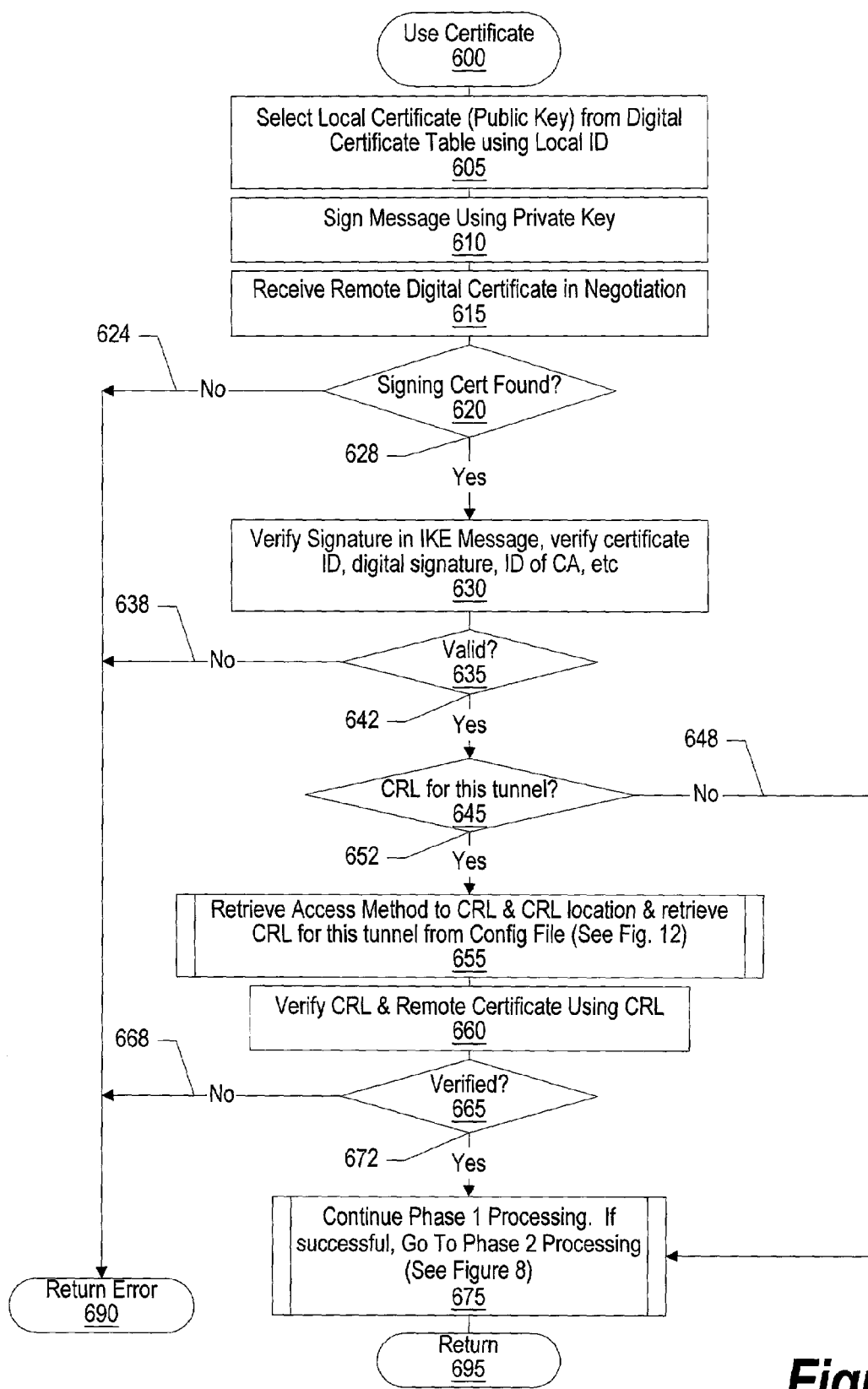
FIG. 6 is a flowchart showing the details involved in using a certificate to create a secure phase 1 tunnel.

FIG. 6 is a flowchart showing the details involved in using a certificate to create a secure phase 1 tunnel. Processing commences at 600 whereupon the local certificate is selected from the digital certificate database using the local ID (step 605). A message is signed using the local machine's private key (step 610). The digital certificate corresponding to the remote computer is received in negotiation by the remote machine (step 615). A determination is made as to whether the signing certificate was found in the digital certificate (decision 620). The signing certificate is the Certification Authority (CA) certificate, also known as the root or issuer's certificate that is used to verify that the remote certificate is "trusted" and authentic. If the signing digital certificate is not found, decision 620 branches to "no" branch 624 whereupon an error is returned (return 690).

If the signing digital certificate is found, decision 620 branches to "yes" branch 628 whereupon the certificate is verified (step 630). Verification step 630 includes checking whether the ID in the digital certificate matches the ID in the IKE message, whether the date in the certificate is valid, whether the signature matches a signature calculated by using the issuer's public key. In one embodiment, the CA certificate is locally stored and used to verify the remote computer's certificate. A determination is made as to whether the certificate is valid (decision 635). If it is not valid, decision 635 branches to "no" branch 638 whereupon an error is returned (return 690).

On the other hand, if the digital certificate is valid, decision 635 branches to "yes" branch 642 whereupon a determination is made as to whether a certification revocation list (CRL) is used for this tunnel being created (decision 645). If a CRL is not being used, decision 645 branches to "no" branch 648 which bypasses the CRL steps. On the other hand, if a CRL is used, decision 645 branches to "yes" branch 652 whereupon the CRL access method and the CRL's network location are selected from a configuration file for the tunnel being created (step 655). The CRL is verified using a digital certificate to check the signature on the CRL. If the CRL is valid, the remote certificate is verified using the CRL access method and addressing the CRL location (predefined process 660, see FIG. 12 for further details). A determination is made as to whether the CRL and the remote certificate are verified (decision 665). If either the CRL or the remote certificate are not verified, decision 665 branches to "no" branch 668 whereupon an error is returned (return error 690). If both the CRL and the remote certificate are verified, decision 665 branches to "yes" branch 672 whereupon the remaining phase 1 processing continues and, if phase 1 completes successfully, phase 2 processing commences (predefined process 675, see FIG. 8 for further details). Phase 2 processing uses the security associations (SAs) created during phase 1 to protect the data between the computers. Digital certificates are used in phase 1. Many phase 2 processes can be performed between the two computers based on the encryption keys created during phase 1. Phase 1 processing is then performed periodically to refresh the keys used in phase 2 processing. Use certificate processing then returns at 695.

FIG. 7 is a database diagram showing a database used to provide flexible security policies for phase 1 and phase 2 processing as well as the processing flow between the various database components. Security processing includes phase 1 processes 705 and phase 2 processes 710. Phase 1 process 705 initiates by receiving a particular remote ID from the user (i.e., from a GUI interface) or from a command line. The remote ID is used to select a matching remote ID entry from Phase 1 ID Rules List 710. The Phase 1 Rules List includes the following information:

P1 ID Rules List Name—a logical name provided by the DB administrator used as a DB search key.

Rule Number—integer containing the relative order of this rule.

Remote ID Type (the values accepted by the related ID fields depend on the Remote ID Type). Choices include ID_IPV4_ADDR, ID_FQDN, ID_USER_FQDN, ID_IPV6_ADDR, ID_DER_ASN1_DN, ID_DER_ASN1_GN, ID_KEY_ID, and GROUP_ID.

Remote ID—supports a wildcard ("*") character.

Remote ID Netmask (optional, depending on Remote ID Type).

Local ID Index—uses IDir when acting as a responder, IDii when acting as an initiator.

Phase 1 Security Policy Index.

Phase 2 ID Rules List—each Phase 1 rule can have a separate default Phase 2 ID Rules List and its own policy definition. Overlap between Phase 1 IDs and Phase 2 IDs is not a problem because the context of a particular Phase 1 SA is used for corresponding Phase 2 data traffic.

A remote ID may be part of a group that is stored in Group 715. In this way, one tunnel definition can include a list of remote IDs. This allows one security policy to be configured with individual members simply added and deleted from the group. Group 715 includes the following information:

Group Name—a unique logical name that can be used as a database search key.

Number of IDs in the group.

List of IDs (Remote ID and Remote ID Type).

IP Addresses of the remote system (optional).

Phase 1 ID Rules List 710 links a local ID/remote ID pair to data within Phase 1 Security Policy 720. The Phase 1 Security Policy information includes the following:

Phase 1 Security Policy Name, used as a database search key.

Initiator Proposal List Index—an index to a initiator proposal list record (see Proposal List 725, below). If the Initiator Proposal List Index is null then initiation with the remote ID is not allowed (i.e., the system only acts as a responder to the remote ID).

Responder Proposal List Index—an index to a responder proposal list record (see Proposal List 725, below). If this value is null, then response is not allowed (i.e., system only acts as an initiator when dealing with the remote ID). If both the Initiator Proposal List Index and the Responder Proposal List Index values are null, then no negotiation is allowed between the systems.

Negotiation Mode—ISAKMP Main (normal negotiation) or Aggressive (faster negotiation).

Minimum SA Lifesize—the security association lifesize in Kbytes, the lowest value is accepted as a responder.

Minimum SA Lifetime—the security association lifetime in seconds, the lowest value is accepted as a responder.

Default SA Lifesize—the security association lifesize in Kbytes used as a default if all associated transforms have 0 SA lifesize.

Default SA Lifetime—the security association lifetime in seconds used as a default if all associated transforms have 0 SA lifetime.

SA Refresh Threshold—an integer representing the percentage of SA life left at which a refresh is requested.

Phase 1 Tunnel Time-of-Day—a string containing a start and stop time using a 24 hour clock. For example, "0800–1730" would allow the tunnel to exist from 8:00 AM to 5:30 PM. This parameter is used to determine the times during which the tunnel is allowed to exist.

Phase 1 Tunnel Day(s) of week—a string containing a number representing the days of the week that the tunnel can be active. For example, "0,1,3" would allow the tunnel to be active on Sunday, Monday, and Wednesday. This parameter determines which days a tunnel is allowed to exist.

Phase 1 Security Policy 720 links to data within Phase 1 Proposal List 725. The Phase 1 Proposal List information includes the following:

Phase 1 Proposal List Name, used as a database search key.

The number of proposals within the list.

Phase 1 Proposal Index List—a list of indexes to specific Phase 1 proposal objects (see Phase 1 Proposal 730, below, for further details).

Phase 1 Proposal List 725 links to one or more Phase 1 Proposals 730. The Phase 1 Proposals include the following information:

Phase 1 Proposal Name, used as a database search key.

The number of ISAKMP Transforms.

ISAKMP Transform Index List (see Phase 1 Transforms 735, below, for further details).

Phase 1 Proposal 730 links to one or more Phase 1 Transforms 735. The phase 1 proposal sent to a responder is a list of transforms included in Phase 1 Transforms 735. The Phase 1 Transforms include the following information:

Phase 1 Transform Name, used as a database search key.

Transform Type, such as the Oakley transform type.

Protocol Type, such as the ISAKMP protocol.

Encryption Algorithm, such as DES or 3DES, used to encrypt the information.

Hash Algorithm, such as MD5 (HMAC), SHA, etc.

Authentication Method, such as DSS signature, RSA signature, RSA encryption (public key), and pre-shared keys. The authentication method determines what key data will be fetched from either Public/Private Keys 740 or Pre-Shared Keys 745.

Group Description.

Security Association (SA) Lifesize in Kbytes, if this value is 0, then only the Lifetime is used.

Security Association (SA) Lifetime in seconds, if this value is 0, then only the Lifesize is used. Note that Lifesize and Lifetime cannot both be 0.

Key Length—the length of keys for variable key encryption algorithms.

Depending on the authentication method used, key values are fetched from Public/Private Keys database 740 and Pre-Shared Keys database 745. For authentication methods that use public key encryption, Public/Private Keys database 740 is used. The Public/Private Keys database includes local private keys and corresponding digital certificates which contain the corresponding public key of the local ID and signing certificates including public keys corresponding to the signing certificates.

Pre-shared Keys Database 745 is used to pre-shared fetch keys for those authentication methods that use pre-shared keys for authenticating systems. The Pre-shared Keys Database includes the following information:

Phase 1 Remote ID Type, referenced from Phase 1 ID Rules List 710, see Phase 1 ID Rules List 710 for various types used.

Phase 1 Remote ID, a unique remote ID that is used as a DB search key.

Pre-shared key value, an ASCII string representing hexadecimal values.

Local ID Database (LID) 750 includes one or more local IDs that pertain to the local system. Depending on the remote ID that is used, a different local ID can be applied. For example, to one remote system, the local system may have an ID of "Able," and to a second remote system, the local system may have an ID of "Baker." The Local ID database allows the local system to have this flexibility. Information stored in the Local ID database includes:

Local ID Name—a unique logical name used as a DB search key.

Local ID Type—see Phase 2 ID Rules List 760 for information concerning these types.

Local ID—a string representing the Phase 1 ID, used as an initiator ID or a responder ID depending on the role of ISAKMPD.

Phase 2 ID Rules List 760 is linked by Phase 1 ID Rules List 710 so that each Phase 1 rule can have a separate Phase 2 ID Rules List (see the Phase 2 ID Rules List field within Phase 1 ID Rules List 710). The Phase 2 ID Rules List information includes the following:

P2 ID Rules List Name—a unique logical name provided by the DB administrator used as a DB search key.

Rule Number—integer containing the relative order of this rule.

Local ID Type (the values accepted by the related ID fields depend on the Local ID Type). Choices include ID_IPV4_ADDR, ID_IPV4_ADDR_SUBNET, ID_IPV4_ADDR_RANGE, ID_USER_FQDN, ID_IPV6_ADDR, ID_IPV6_ADDR_SUBNET, ID_FQDN, ID_IPV6_ADDR_RANGE, ID_DER_ASN1_DN, ID_DER_ASN1_GN, ID_KEY_ID, and GROUP_ID.

Local ID—depending on the type, in some cases, such as FQDN a wildcard ("*") character is supported.

Local ID Netmask (optional, depending on Local ID Type).

Local ID Range (optional, depending on Local ID Type).

Local ID Protocol—match TCP, UPD, or any other protocol.

Local ID Start Port Number

Local ID End Port Number

Remote ID Type (the values accepted by the related ID fields depend on the Local ID Type). Choices are ID_IPV4_ADDR, ID_IPV4_ADDR_SUBNET, ID_IPV4_ADDR_RANGE, ID_USER_FQDN, ID_IPV6_ADDR, ID_IPV6_ADDR_SUBNET, ID_FQDN, ID_IPV6_ADDR_RANGE, ID_DER_ASN1_DN, ID_DER_ASN1_GN, ID_KEY_ID, and GROUP_ID.

Remote ID—depending on the type, in some cases, such as FQDN a wildcard ("*") character is supported.

Remote ID Netmask (optional, depending on Remote ID Type).

Remote ID Range (optional, depending on Remote ID Type).

Remote ID Protocol—match TCP, UPD, or any other protocol.

Remote ID Start Port Number

Remote ID End Port Number

Phase 2 Security Policy Index.

Phase 2 ID Rules List 760 links to Phase 2 Security Policy 765. The Phase 2 Security Policy information includes the following:

Phase 2 Security Policy Name, used as a database search key.

Negotiation Mode—quick mode or ISAKMP main (normal negotiation). Quick mode is used as the default value.

Initiator Proposal List Index—an index to a initiator proposal list record (see Proposal List 770, below). If the Initiator Proposal List Index is null then initiation with the remote ID is not allowed (i.e., the system only acts as a responder to the remote ID).

Responder Proposal List Index—an index to a responder proposal list record (see Proposal List 770, below). If this value is null, then response is not allowed (i.e., system only acts as an initiator when dealing with the remote ID). If both the Initiator Proposal List Index and the Responder Proposal List Index values are null, then no negotiation is allowed between the systems.

Perfect Forward Security (PFS)—flag whether PFS is on or off.

Group Description.

Minimum SA Lifesize—the security association lifesize in Kbytes, the lowest value is accepted as a responder.

Minimum SA Lifetime—the security association lifetime in seconds, the lowest value is accepted as a responder.

Default SA Lifesize—the security association lifesize in Kbytes used as a default if all associated transforms have 0 SA lifesize.

Default SA Lifetime—the security association lifetime in seconds used as a default if all associated transforms have 0 SA lifetime.

SA Refresh Threshold—an integer representing the percentage of SA life left at which a refresh is requested.

Phase 2 Tunnel Time-of-Day—a string containing a start and stop time using a 24 hour clock. For example, "0800-1730" would allow the tunnel to exist from 8:00 AM to 5:30 PM. This parameter is used to determine the times during which the tunnel is allowed to exist.

Phase 2 Tunnel Day(s) of week—a string containing a number representing the days of the week that the tunnel can be active. For example, "0,1,3" would allow the tunnel to be active on Sunday, Monday, and Wednesday. This parameter determines which days a tunnel is allowed to exist.

Phase 2 Security Policy 765 links to data within Phase 2 Proposal List 770. The Phase 2 Proposal List information includes the following:

Phase 2 Proposal List Name, used as a database search key.

The number of proposals within the list.

Phase 2 Proposal Index List—a list of indexes to specific Phase 2 proposal objects (see Phase 2 Proposal 775, below, for further details).

Phase 2 Proposal List 770 links to one or more Phase 2 Proposals 775. The Phase 2 Proposals include the following information:

Phase 2 Proposal Name, used as a database search key.

The number authentication header (AH) Transforms, if this value is 0 then AH will not be proposed.

AH Transform Index List—a list of indexes to transform objects.

The number encapsulating security payload (ESP) Transforms, if this value is 0 then ESP will not be proposed. ESP is used for carrying encrypted data and is enhanced to include functions, such as digest value, originally provided by AH.

ESP Transform Index List—a list of indexes to transform objects.

Number of IP Compression (IPComp) transforms, if this value is 0 then IP Compression will not be proposed.

IPComp Transform Index List—a list of indexes to transform objects.

Phase 2 Proposal 775 links to one or more Phase 2 Transforms 780. The phase 2 proposal sent to a responder is a list of transforms included in Phase 2 Transforms 780. The Phase 2 Transforms include the following information:

Phase 2 Transform Name, used as a database search key.

Transform Type, such as CDMF, DES, 3DES, MD5, SHA, IPCOMP_LZS. Note that the transform type choices should be based on what encryption is supported on the system. In an AIX operating system environment, there is a cryptography module database that includes information on the cryptographic support currently installed on the system.

Protocol Type, such as AH, ESP, and IP_COM.

Encryption Algorithm, such as DES or 3DES, used to encrypt the information.

Hash Algorithm, such as MD5 (HMAC), SHA, etc.

Authentication Method, such as DSS signature, RSA signature, RSA encryption (public key), and pre-shared keys. The authentication method determines what key data will be fetched from either Public/Private Keys 740 or Pre-Shared Keys 745.

Security Association (SA) Lifesize in Kbytes, if this value is 0, then only the Lifetime is used.

Security Association (SA) Lifetime in seconds, if this value is 0, then only the Lifesize is used. Note that Lifesize and Lifetime cannot both be 0.

Group Description, such as 1, 2, or 3.

Encapsulation mode—whether the encapsulation is in tunnel or transport mode.

Authentication Algorithm, used if the protocol, such as ESP, uses an authentication algorithm.

Key Length—the length of keys for variable key encryption algorithms.

Key Rounds.

Compress Dictionary Size.

Compress Private Algorithm.

Tunnels are created during both Phase 1 and Phase 2 processing. Definitions are used to initiate the Phase 1 and Phase 2 tunnels. Phase 1 Initiate Tunnel Definitions Database 785 includes information for initiating a Phase 1 tunnel and Phase 2 Initiate Tunnel Definitions Database 790 includes information for initiating a Phase 2 tunnel. Phase 1 Initiate Tunnel Definitions Database 785 includes the following fields:

Phase 1 Tunnel Definition Number, a number that identifies the entry in the database, used as a database search key.

Phase 1 Tunnel Name—a unique logical name for the tunnel definition, also used as a database search key.

Remote ID Type, as defined in Internet DOI, and including ID-IPV4_ADDR, ID_FQDN, ID_USER_FQDN, ID_IPV6_ADDR, ID_DER_ASNI_DN, ID_DER_ASN1_GN, and ID_KEY_ID.

Remote ID—the responder's ID.

Remote IP Address of the Phase 1 tunnel if the IP address cannot be derived from the Remote ID.

Auto-Start—whether the tunnel should automatically be started upon a reboot (Y/N).

Phase 2 Initiate Tunnel Definitions Database 790 includes the following fields:

Phase 2 Tunnel Definition Number, a number that identifies the entry in the database, used as a database search key.

Phase 2 Tunnel Name—a unique logical name for the tunnel definition, also used as a database search key.

Phase 1 Initiate Tunnel Definition Index, optionally links to a Phase 1 Tunnel Definition as index.

Remote Client ID Type as defined in Internet DOI, and including ID-IPV4_ADDR, ID_FQDN, ID_USER_FQDN, ID_IPV6_ADDR, ID_DER_ASN1_DN, ID_DER_ASNI_GN, and ID_KEY_ID.

Local Client ID (IDci).

Local Client Netmask—optional and only valid for certain ID Types.

Local Client ID Range—optional and only valid for certain ID Types.

Local Client ID Protocol ID (optional).

Local Client ID Port Number (optional).

Remote Client ID Type as defined in Internet DOI, and including ID-IPV4_ADDR, ID_FQDN, ID_USER_FQDN, ID_IPV6_ADDR, ID_DER_ASN1_DN, ID_DER_ASN1_GN, and ID_KEY_ID.

Remote Client ID (IDcr).

Remote Client Netmask—optional and only valid for certain ID Types.

Remote Client ID Range—optional and only valid for certain ID Types.

Remote Client ID Protocol ID (optional).

Remote Client ID Port Number (optional).

Initiation/Start Mode—whether the tunnel is driven by an IP packet or manual initiation.

Auto-Start—whether the tunnel should automatically be started upon a reboot (Y/N).

FIG. 8 is a flowchart showing steps performed in using policies to communicate through phase 1 and phase 2 processing.

In Phase 1, Initiator 800 commences by proposing (step 810) specifications, authentication methods, and encryption algorithms to responder 805. Responder, in turn, receives the proposal (step 815) and selects an authentication method, specifications, and an encryption algorithm from the proposal and returns the selection to the initiator (step 820). The initiator receives the responder's selection (step 825). A Diffie-Hellman key exchange is performed between the initiator and responder (steps 840 and 845) and authentication data is exchanged depending upon the selected authentication method.

Each party, the initiator and the responder, establishes an Internet Security Association and Key Management Protocol (ISAKMP) Security Association (steps 850 and 855) to use in securing information sent between the computer systems. In Phase 2 processing, each system creates IPsec Security Associations for securing data traffic sent between the systems by negotiating one or more Security Associations and the systems exchange IP addresses by using phased IDs and policies (steps 860 and 870, for further details about IDs and policies see FIG. 7). After the IDs have been exchanged and a security association has been negotiated, each system sends and receives protected data traffic using the established policies and profiles (steps 870 and 875).

Figure 9:
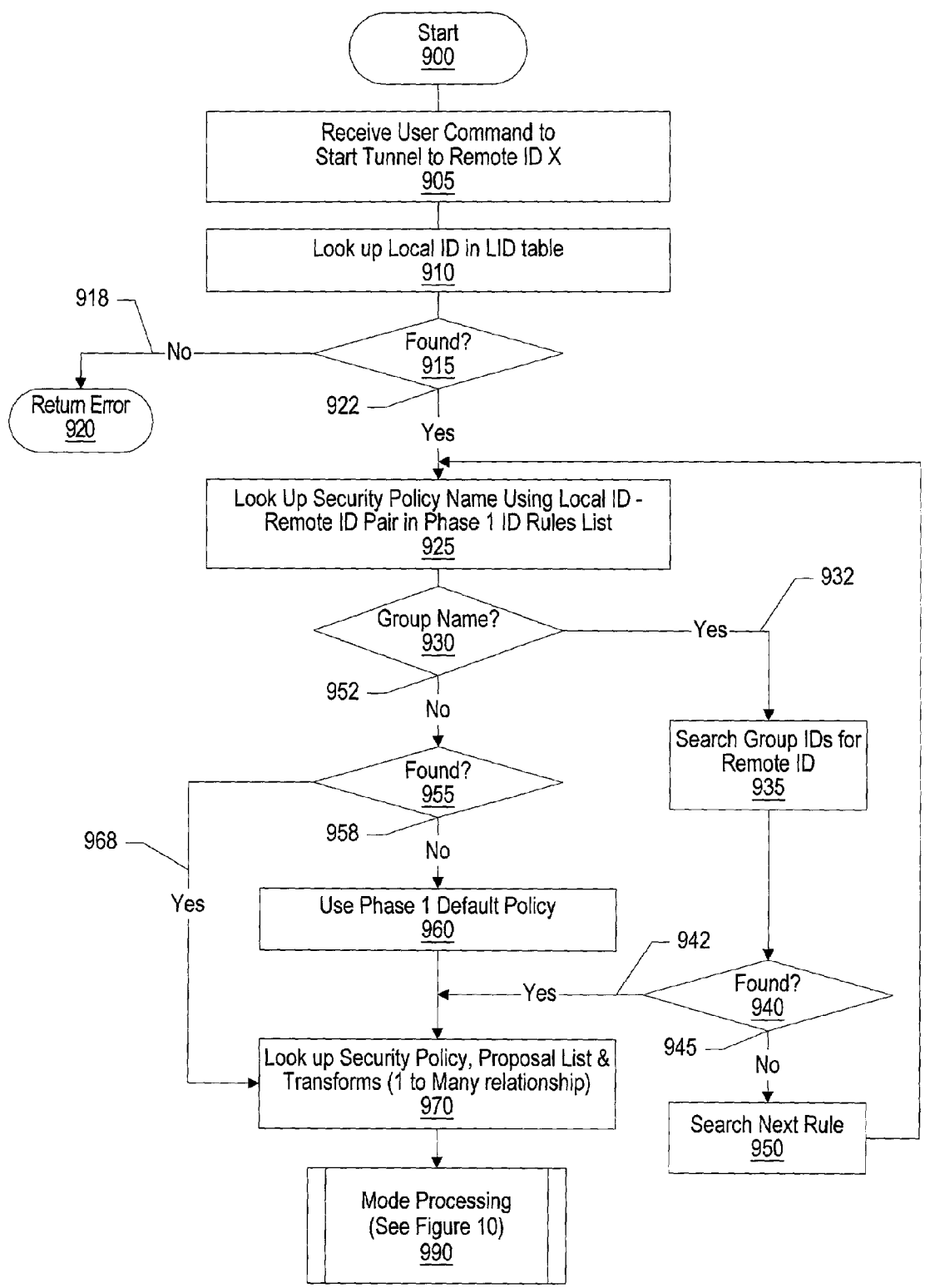
FIG. 9 is a flowchart showing processing database information regarding security policies during phase 1 authentication.

FIG. 9 is a flowchart showing processing database information regarding security policies during phase 1 authentication. Processing commences at 900 whereupon a user command is received to create a tunnel to a remote computer system (step 905). The local identifier database is searched for a local identifier that corresponds to the user's computer system (step 910). The user's machines may have multiple local identifiers with each of the identifiers corresponding to a different set of remote systems. A determination is made as to whether the remote identifier was found in the LID database (step 915). If it was not found, decision 915 branches to "no" branch 918 and processing terminates at 920.

On the other hand, if the local identifier was found in the LID database, decision 915 branches to "yes" branch 922 and processing continues. The retrieved local identifier and the remote identifier form a local ID-Remote ID pair that is used to find a security policy name within the Phase 1 ID Rules List (step 925). A determination is made as to whether the located Phase 1 ID Rules List information includes a group name (decision 930). If the located Phase 1 ID Rules List information includes a group name, decision 930 branches to "yes" branch 932 whereupon the identifiers within the group database are searched for a corresponding remote ID (step 925). A determination is made as to whether the remote ID was found (decision 940). If the remote ID was found in the group identifiers, decision 940 branches to "yes" branch 942 whereupon the corresponding security policy, proposal list, and transforms are searched from their corresponding database areas (step 970) and processing continues with mode processing (predefined process 990, see FIG. 10 for mode processing details). On the other hand, if the remote ID was not found in the group identifiers, decision 940 branches to "no" branch 945 whereupon the next rule within the Phase 1 ID Rules List with the local ID-Remote ID pair is searched (step 950) and processing loops back to look up the security policy name using the local ID-Remote ID pair (step 925).

Returning to decision 930, if a group name is not found within the Phase 1 ID Rules List corresponding to the local ID-Remote ID pair, decision 930 branches to "no" branch 952. A determination is made as to whether the local ID-remote ID pair was found in the Phase 1 ID Rules List (decision 955). If the pair was not found, decision 955 branches to "no" branch 958 and a default Phase 1 security policy is used for creating the tunnel (step 960). On the other hand, if the pair was found, decision 955 branches to "yes" branch 968 bypassing the use of the default policy because a policy corresponding to the local ID-Remote ID pair was found. For either the identified security policy or the default policy, the database is searched for a corresponding security policy, proposal list, and transforms (step 970). A one-to-many relationship exists with this retrieval. Processing continues with mode processing (predefined process 990, see FIG. 10 for mode processing details).

Figure 10:
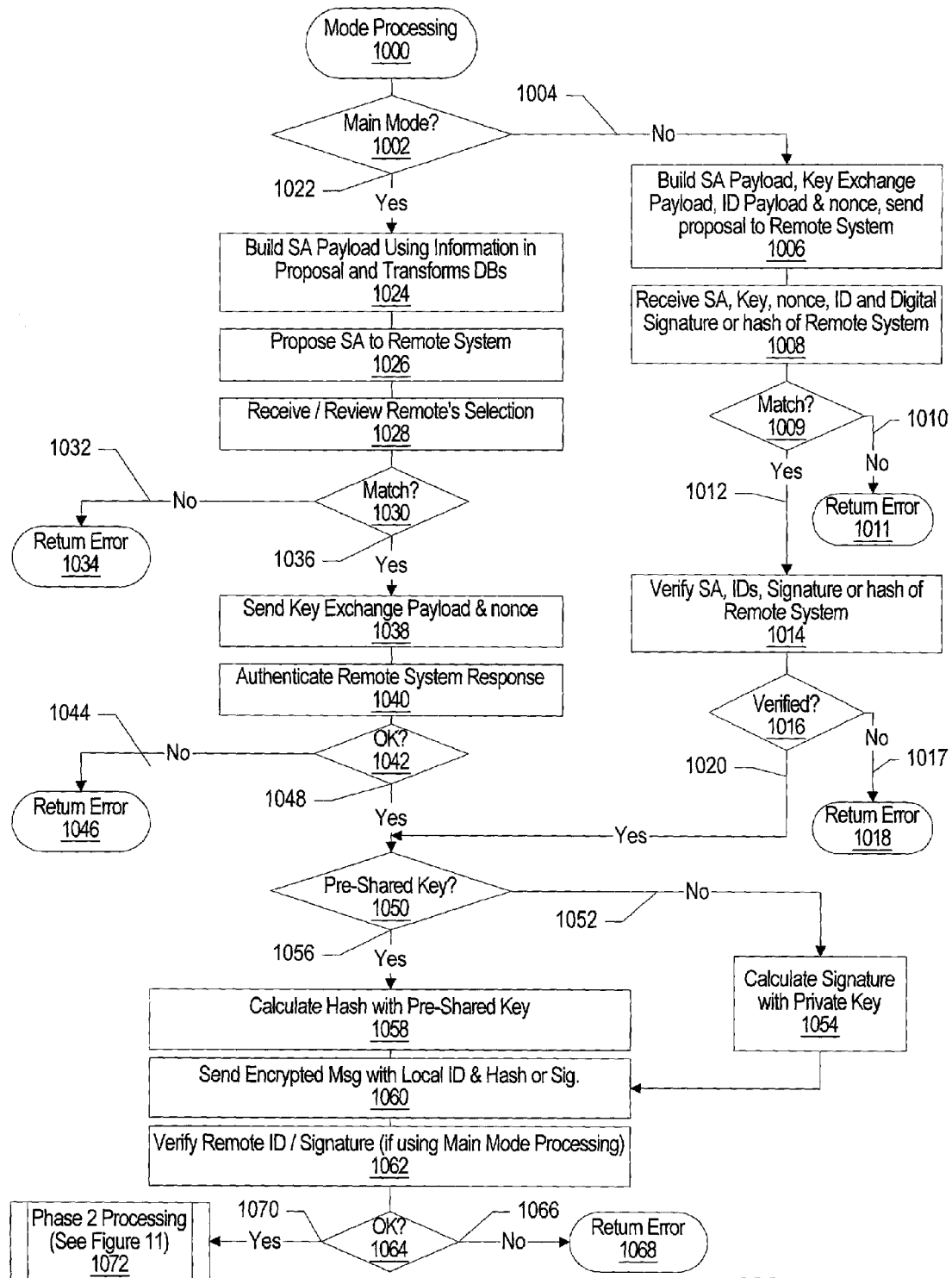
FIG. 10 is a flowchart showing mode processing during phase 1 authentication.

FIG. 10 is a flowchart showing mode processing during phase 1 authentication. Mode processing commences at 1000 (processing continues from the processing shown in FIG. 9). A determination is made as to whether the Phase 1 security authentication uses main mode or quick mode processing (decision 1002). If Phase 1 security authentication uses quick mode processing, decision 1002 branches to "no" branch 1004. A security association payload, key exchange payload, ID payload and nonce are created and sent from the computer system to the remote computer system (step 1006). A security association, key, nonce, ID, and digital certificate (or hash) are received from the remote system (step 1008). A determination is made as to whether the remote computer's selection matches the proposal sent (decision 1009). If the selection does not match, decision 1009 branches to "no" branch 1010 whereupon an error is returned at 1011. On the other hand, if the selection matches the information sent to the remote computer, decision 1009 branches to "yes" branch 1012 whereupon the security association, digital signature (or hash) received from the remote computer system are verified (step 1014). A determination is made as to whether the verification is successful (decision 1016). If the verification is not successful, decision 1016 branches to "no" branch 1017 and an error is returned at 1018. On the other hand, if the verification is successful, decision 1016 branches to "yes" branches 1020 whereupon key processing commences (see description for steps 1050 to 1072 below).

Returning back to decision 1002, if main mode processing is being used for security authentication, decision 1002 branches to "yes" branch 1022 whereupon a security association payload is created using information from the retrieved proposal and transform databases (step 1024). The proposal is sent to the remote system (step 1026). The remote computer's selection is received and reviewed (step 1028). A determination is made as to whether the remote computer's selection matches the proposal and transforms sent (decision 1030). If the selection does not match, decision 1030 branches to "no" branch 1032 whereupon an error is returned at 1034. On the other hand, if the selection matches the information sent to the remote computer, decision 1030 branches to "yes" branch 1036 whereupon a key exchange payload and nonce are sent to the remote computer system (step 1038). The remote system's response to the key exchange payload and nonce are received and authenticated (1040). A determination is made as to whether the remote computer's response is authenticated (decision 1042). If the response is not authenticated, decision 1042 branches to "no" branch 1044 whereupon an error is returned at 1046. On the other hand, if the response is authenticated, decision 1042 branches to "yes" branch 1048 and processing continues.

A determination is made as to whether the authentication method uses a pre-shared key or digital certificates (decision 1050). If the authentication method uses a digital certificate, decision 1050 branches to "no" branch 1052 and a hash value and digital signature are calculated using a private key corresponding to the computer system (step 1054). On the other hand, if a pre-shared key is being used for authentication, decision 1050 branches to "yes" branch 1056 whereupon a hash value is calculated using the pre-shared key (step 1058).

An encrypted third message is sent using the local identifier and the hash value or the digital signature (step 1060). If main mode processing is being used, an encrypted message is received from the remote computer and the remote identifier is verified using the hash value (step 1062). If digital signatures are being used, step 1062 uses the remote computer's public key from the digital certificate to verify the remote identifier and signature. A determination is made as to whether the remote identifier (and possibly the digital signature) are verified (decision 1064). If the remote identifier/digital signature are not verified, decision 1064 branches to "no" branch whereupon an error is returned at 1068. On the other hand, if the remote identifier/digital signature are verified, decision 1064 branches to "yes" branch 1070 whereupon phase 2 processing is initiated (predefined process 1072, see FIG. 11 for details regarding phase 2 processing).

Figure 11:
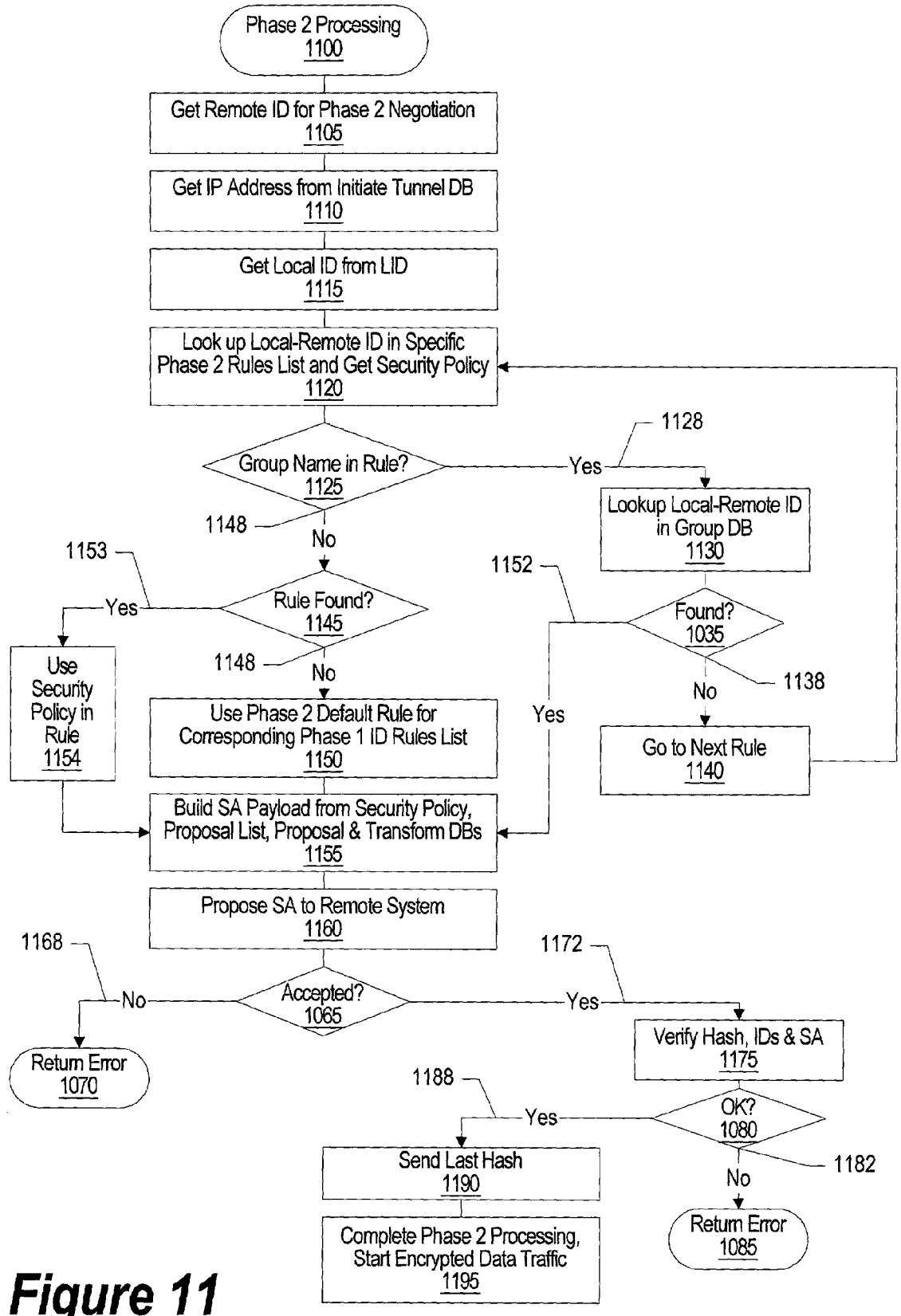
FIG. 11 is a flowchart showing processing database information regarding security policies during phase 2 authentication.

FIG. 11 is a flowchart showing processing database information regarding security policies during phase 2 authentication. Phase 2 processing commences at 1100 whereupon a remote identifier is retrieved for phase 2 negotiations (step 1105). An IP address corresponding to the remote system is retrieved from the initiate tunnel definitions database (step 1110). A local identifier corresponding to the computer system is retrieved from the local identifier database (step 1115). As mentioned in FIG. 9, a computer system can have multiple local identifiers depending on the remote identifier with which it is communicating. The local ID-Remote ID pair are used to find a specific Phase 2 rule from the Phase 2 ID Rules list (step 1120).

A determination is made as to whether a group name is included with the rule (decision 1125). If a group name is included with the rule, decision 1125 branches to "yes" branch 1128 whereupon the group database is searched for the local-remote ID (step 1130). A determination is made as to whether the local-remote ID was found (decision 1135). If the ID was not found, decision 1135 branches to "no" branch 1138 whereupon processing continues to the next rule in the Phase 2 ID Rules List with a matching local-remote ID pair (step 1140) and processing loops back to step 1120 to process the next rule. On the other hand, if a group name is not in the rule, decision 1125 branches to "no" branch 1148 whereupon a determination is made as to whether a rule was found for the local ID-Remote ID pair (decision 1145).

If a rule was not found, decision 1145 branches to "no" branch 1148 whereupon a phase 2 default rule corresponding to the identified phase 1 rule is used (step 1150). In this manner, each phase 1 rule can have a separate default phase 2 rule list. On the other hand, if a rule was found, decision 1145 branches to "yes" branch 1153 bypassing the use of a default rule and uses the security policy found in the rule (step 1154). A security association payload is created using the phase 2 security policy, proposal list and transform databases (step 1155). The created security association is proposed to the remote computer system (step 1160).

A determination is made as to whether the proposed security association was accepted by the remote computer system (decision 1165). If the proposed security association was not accepted, decision 1165 branches to "no" branch 1168 whereupon an error is returned at 1170. On the other hand, if the proposed security association is accepted, decision 1165 branches to "yes" branch 1172 whereupon a hash value, IDs, and a security association is received and verified from the remote computer system (step 1175). A determination is made as to whether the received hash, IDs, and security association are verified (decision 1180). If they are not verified, decision 1180 branches to "no" branch 1182 whereupon an error is returned at 1185. On the other hand, if they are verified, decision 1180 branches to "yes" branch 1188 whereupon a last hash is sent to the remote computer system (step 1190). Phase 2 processing is completed and data traffic between the two computers using the created secure tunnel can commence (step 1195).

Figure 12:
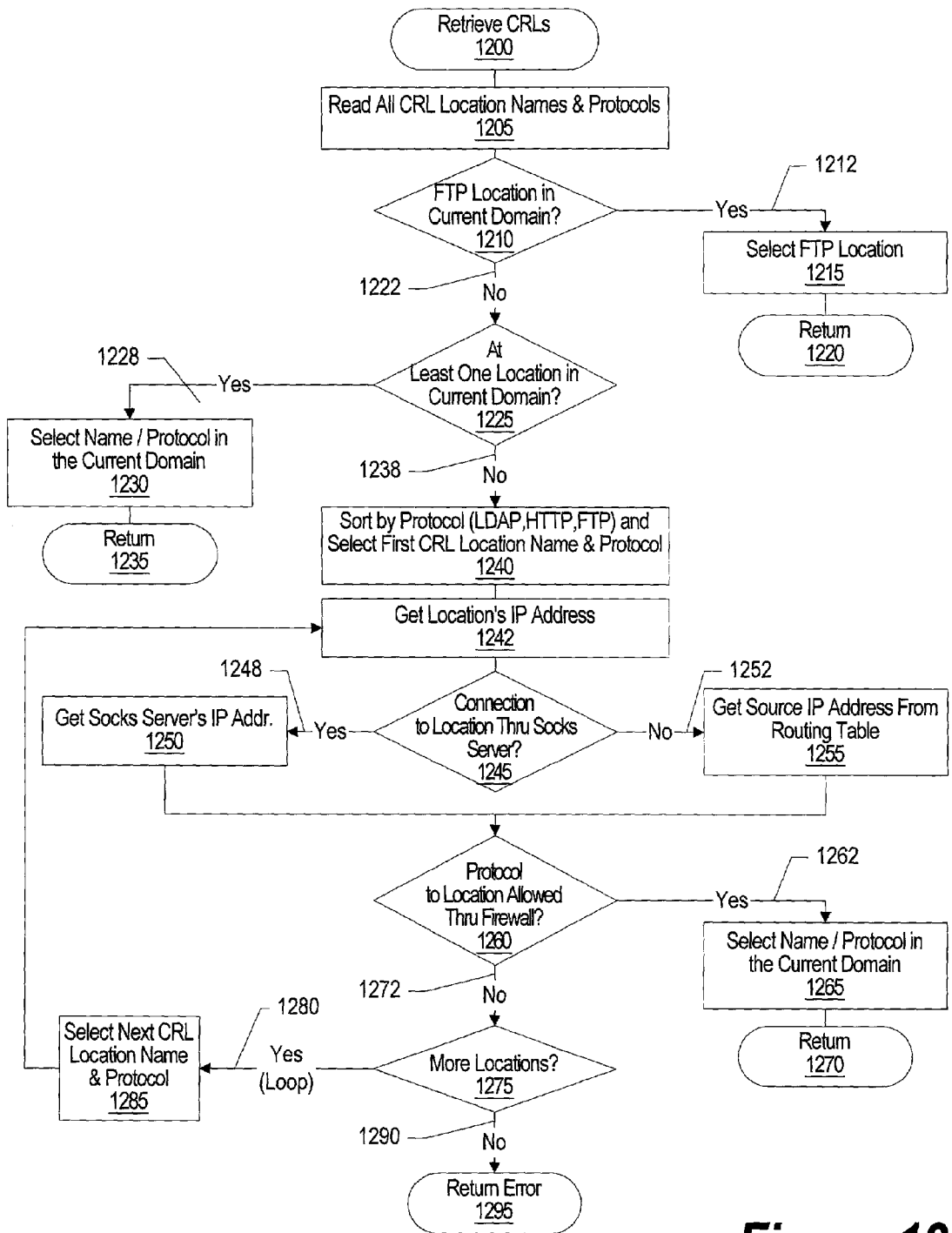
FIG. 12 is a flowchart showing the dynamic determination of a protocol method and location from which to retrieve CRL information.

FIG. 12 is a flowchart showing the dynamic determination of a protocol method and location from which to retrieve CRL information. Processing commences at 1200 whereupon all CRL location names and protocols are read from the digital certificate (step 1205). The CRL information is included in a data structure within the digital certificate data. Protocols used may include the File Transfer Protocol (FTP), the Lightweight Directory Access Protocol (LDAP), the HyperText Transfer Protocol (HTTP), among others. A determination is made as to whether a FTP location exists in the current domain, i.e., in the intranet or behind the firewall (decision 1210). If an FTP location does exist in the current domain, decision 1210 branches to "yes" branch 1212 whereupon the FTP location is selected and used to retrieve CRL information (step 1215) and processing returns to the calling routine at 1220. If an FTP location does not exist in the current domain, decision 1210 branches to "no" branch 1222 whereupon another determination is made as to whether any of the CRL locations are in the current domain (decision 1225).

If at least one location is in the current domain, decision 1225 branches to "yes" branch 1228 whereupon the location in the current domain is selected and used to retrieve CRL information (step 1230) and processing returns to the calling routine at 1235. In one embodiment, HTTP locations are used before LDAP locations to retrieve CRL information from the current domain because retrieving information from the HTTP location is likely faster than retrieving the information from the LDAP location.

If no locations are in the current domain, decision 1225 branches to "no" branch 1238 whereupon processing continues in order to retrieve the CRL information from outside the current domain. The locations are sorted by protocol and the first location is selected (step 1240). LDAP locations are sorted towards the top because of their increased security settings. HTTP locations are included next because of their increased security over FTP locations, and FTP locations are included last because of their decreased security with respect to LDAP and HTTP locations. The first selected location's IP address is then retrieved (step 1242). A determination is made as to whether a connection to the selected location is made through a socks server or proxy server (decision 1245). For a socks server, this determination can be made using the "socs5_getserv( )" API. If the connection is through a socks or proxy server, decision 1245 branches to "yes" branch 1248 whereupon the server's IP address is retrieved (step 1250). On the other hand, if the connection is not through a socks or proxy server, decision 1245 branches to "no" branch 1252 whereupon the source IP address corresponding to the location's IP address is retrieved from a routing table (step 1255).

A determination is made as to whether communication through the organization's firewall is permitted (decision 1260). Details for this determination can be found in the application filed with the U.S. Patent and Trademark Office on Dec. 2, 1999, application Ser. No. 09/453,252, entitled "METHOD AND APPARATUS FOR VERIFYING AND MODIFYING SECURITY CONFIGURATIONS OF NETWORKS," by Wilson, Fiveash, and D'SA which is herein incorporated by reference in its entirety. If communication through the organization's firewall for the location and protocol is allowed, decision 1260 branches to "yes" branch 1262 and the selected location name and protocol are used to retrieve the CRL information (step 1265) and processing returns to the calling routine at 1270.

If communication through the organization's firewall for the location and protocol is not allowed, decision 1260 branches to "no" branch 1272 whereupon a determination is made as to whether there are more CRL locations from the digital certificate left to process (decision 1275). If there are more locations, decision 1275 branches to "yes" branch 1280 whereupon the next CRL location name and protocol are selected (step 1285) and processing loops back to determine whether this location can be used to retrieve CRL information. This looping continues until either a location is found to which communication is allowed and the CRL information is retrieved or until no more locations are left to process, in which case decision 1275 branches to "no" branch 1290 and an error is returned to the calling routine at 1295.

Figure 13:
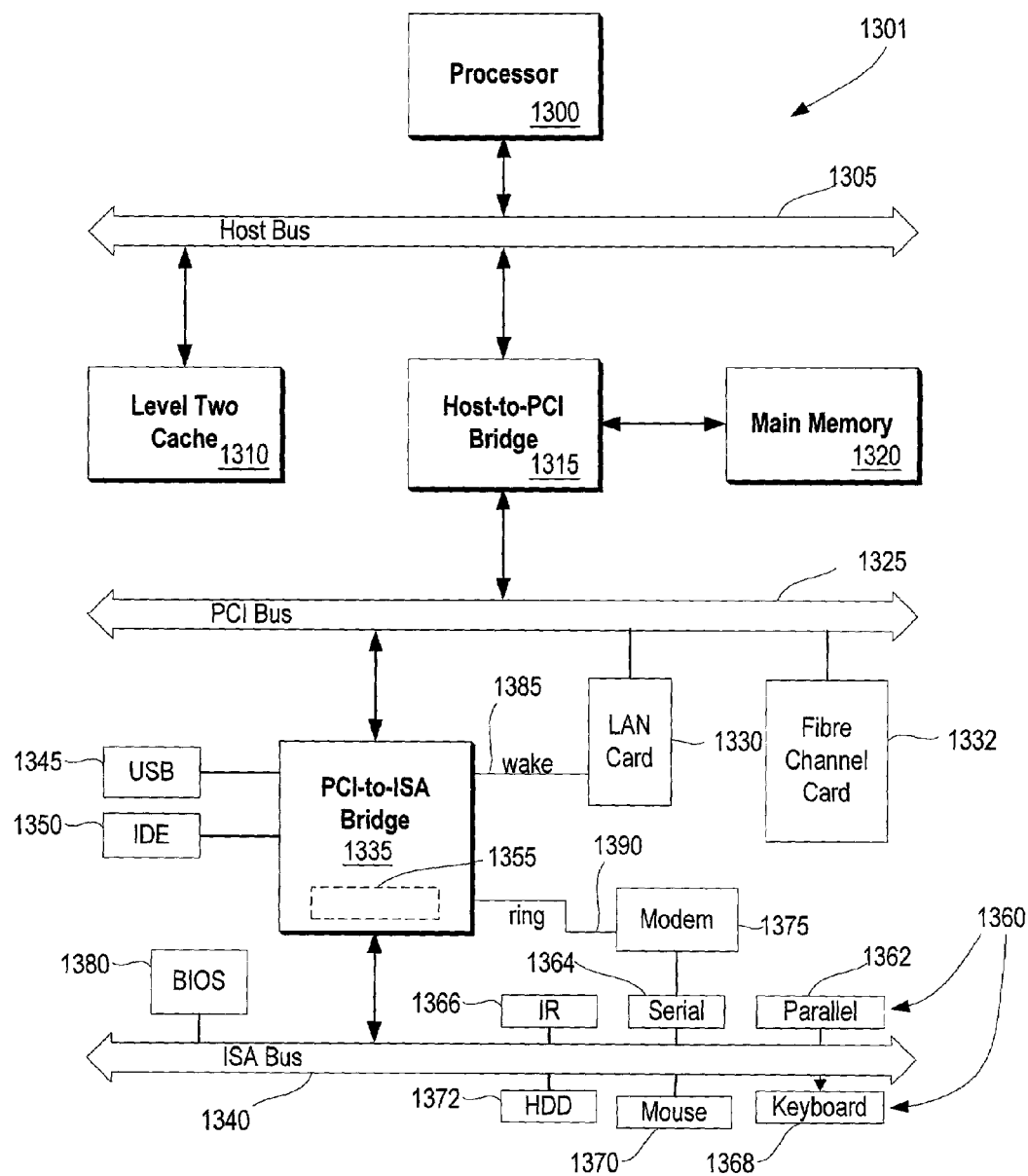
FIG. 13 is a block diagram of an information handling system capable of performing the present invention.

FIG. 13 illustrates information handling system 1301 which is a simplified example of a computer system capable of performing the copy processing described herein. Computer system 1301 includes processor 1300 which is coupled to host bus 1305. A level two (L2) cache memory 1310 is also coupled to the host bus 1305. Host-to-PCI bridge 1315 is coupled to main memory 1320, includes cache memory and main memory control functions, and provides bus control to handle transfers among PCI bus 1325, processor 1300, L2 cache 1310, main memory 1320, and host bus 1305. PCI bus 1325 provides an interface for a variety of devices including, for example, LAN card 1330. PCI-to-ISA bridge 1335 provides bus control to handle transfers between PCI bus 1325 and ISA bus 1340, universal serial bus (USB) functionality 1345, IDE device functionality 1350, power management functionality 1355, and can include other functional elements not shown, such as a real-time clock (RTC), DMA control, interrupt support, and system management bus support. Peripheral devices and input/output (I/O) devices can be attached to various interfaces 1360 (e.g., parallel interface 1362, serial interface 1364, infrared (IR) interface 1366, keyboard interface 1368, mouse interface 1370, and fixed disk (FDD) 1372) coupled to ISA bus 1340. Alternatively, many I/O devices can be accommodated by a super I/O controller (not shown) attached to ISA bus 1340.

BIOS 1380 is coupled to ISA bus 1340, and incorporates the necessary processor executable code for a variety of low-level system functions and system boot functions. BIOS 1380 can be stored in any computer readable medium, including magnetic storage media, optical storage media, flash memory, random access memory, read only memory, and communications media conveying signals encoding the instructions (e.g., signals from a network). In order to attach computer system 1301 another computer system to copy files over a network, LAN card 1330 is coupled to PCI-to-ISA bridge 1335. Similarly, to connect computer system 1301 to an ISP to connect to the Internet using a telephone line connection, modem 1375 is connected to serial port 1364 and PCI-to-ISA Bridge 1335.

While the computer system described in FIG. 13 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of retrieving CRL information, said method comprising:
   receiving a list of one or more servers where the CRL information is stored, the servers each having an identifier;
   determining which of the servers to contact based on the identifier wherein the determining further includes:
     comparing the identifiers corresponding to the servers with a current domain address; and
     selecting one of the servers in response to the selected server's identifier matching the current domain address; and
   selecting an access method to use to retrieve the CRL information from the selected server, wherein the selecting of the access method further includes:
     selecting a fast access method in response to the selected server's identifier matching the current domain address.

2. The method as described in claim 1 wherein the access methods are selected from a group consisting of FTP, LDAP, and HTTP.

3. The method as described in claim 1 wherein the list of servers is retrieved from a digital certificate corresponding to a remote computer system.

4. The method as described in claim 1 wherein the determining further includes selecting another one of the servers in response to the comparing not finding any server identifiers matching the current domain address and wherein the selecting of the access method further includes selecting a secure access method in response to the comparing not finding any server identifiers matching the current domain address.

5. The method as described in claim 1 further comprising retrieving the CRL information from the selected server using the selected access method.

6. An information handling system comprising:
   one or more processors;
   a memory accessible by the processors;
   a nonvolatile storage accessible by the processors;
   a network interface connecting the information handling system to a computer network; and
   a CRL retrieval tool for retrieving CRL information, the CRL retrieval tool including:
     means for receiving a list of one or more servers where the CRL information is stored, the servers each having an identifier;
     means for determining which of the servers to contact based on the identifier wherein the means for determining further includes:
       means for comparing the identifiers corresponding to the servers with a current domain address; and
       means for selecting one of the servers in response to the selected server's identifier matchin the current domain address; and
     means for selecting an access method to use to retrieve the CRL information from the selected server, wherein the means for selecting the access method further includes:
       means for selecting a fast access method in response to the selected server's identifier matching the current domain address.

7. The information handling system as described in claim 6 wherein the access methods are selected from a group consisting of FTP, LDAP, and HTTP.

8. The information handling system as described in claim 6 wherein the means for determining further includes means for selecting another one of the servers in response to the comparing not finding any server identifiers matching the current domain address and wherein the means for selecting the access method further includes means for selecting a secure access method in response to the comparing not finding any server identifiers matching the current domain address.

9. The information handling system as described in claim 6 further comprising
means for retrieving the CRL information from the selected server using the selected access method.

10. A computer program product stored on a computer operable medium for retrieving CRL information, said computer program product comprising:
means for receiving a list of one or more servers where the CRL information is stored, the servers each having an identifier;
means for determining which of the servers to contact wherein the means for determining further includes:
means for comparing the identifiers corresponding to the servers with a current domain address; and
means for selecting one of the servers in response to the selected server's identifier matching the current domain address; and
means for selecting an access method to use to retrieve the CRL information from the selected server, wherein the means for selecting the access method further includes:
means for selecting a fast access method in response to the selected server's identifier matching the current domain address.

11. The computer program product as described in claim 10 wherein the access methods are selected from a group consisting of FTP, LDAP, and HTTP.

12. The computer program product as described in claim 10 wherein the list of servers is retrieved from a digital certificate corresponding to a remote computer system.

13. The computer program product as described in claim 10 wherein the means for determining further includes means for selecting another one of the servers in response to the comparing not finding any server identifiers matching the current domain address and wherein the means for selecting the access method further includes means for selecting a secure access method in response to the comparing not finding any server identifiers matching the current domain address.

14. The computer program product as described in claim 10 further comprising means for retrieving the CRL information from the selected server using the selected access method.

* * * * *

UNITED STATES PATENT AND TRADEMARK OFFICE
CERTIFICATE OF CORRECTION

PATENT NO. : 7,003,662 B2  
APPLICATION NO. : 09/864112  
DATED : February 21, 2006  
INVENTOR(S) : Genty et al.

Page 1 of 1

It is certified that error appears in the above-identified patent and that said Letters Patent is hereby corrected as shown below:

Claim 6, column 20, line 60, please delete "matchin" and insert --matching--.

Signed and Sealed this

Twenty-seventh Day of November, 2007

JON W. DUDAS
*Director of the United States Patent and Trademark Office*